Nov. 20, 1945.　　　W. S. WAGONER　　　2,389,474
APPARATUS FOR MOLDING BLOCKS
Filed Jan. 19, 1944　　　2 Sheets-Sheet 1
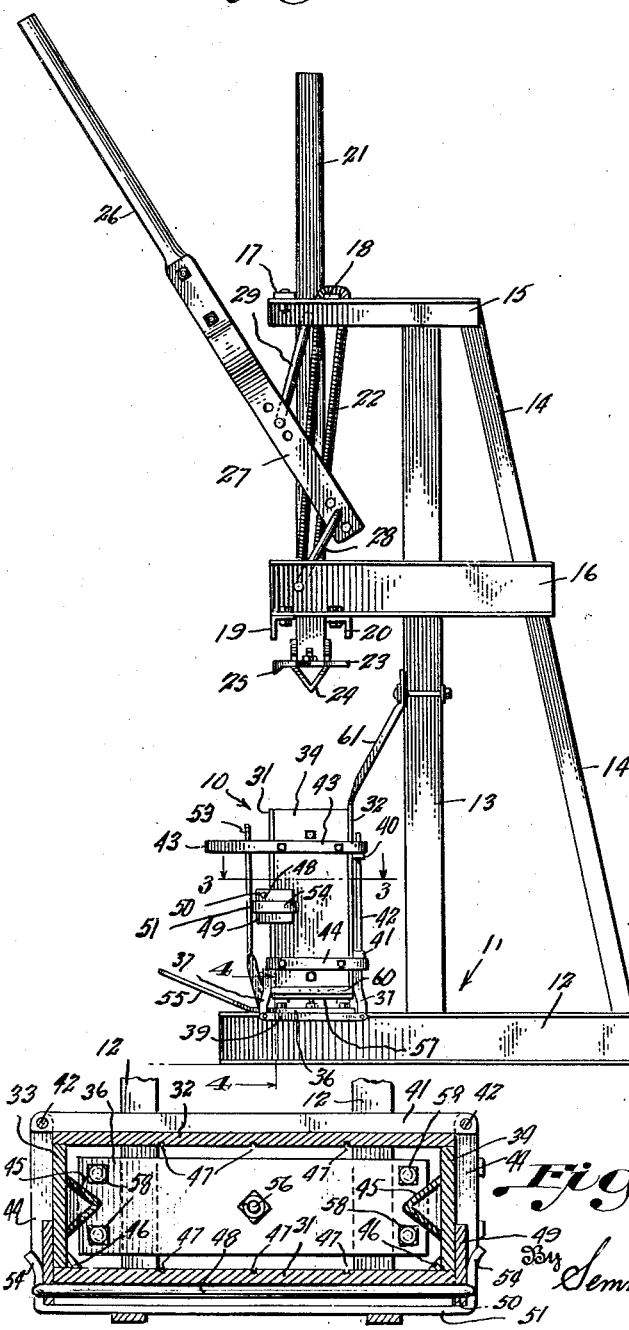
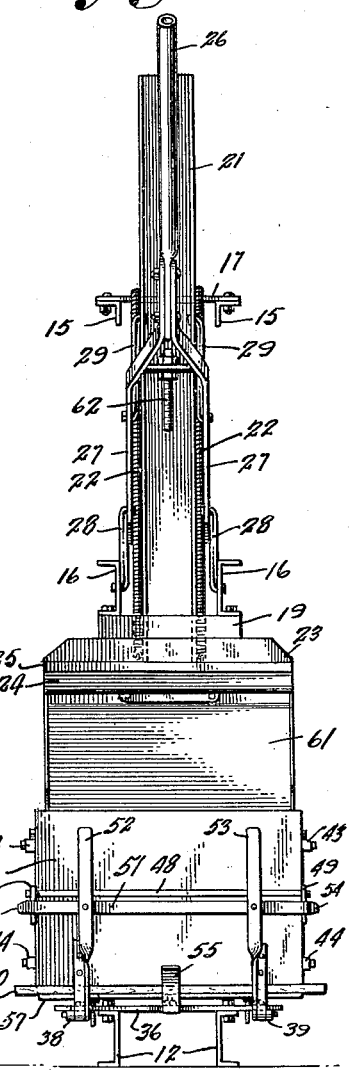
Fig. 1.
Fig. 2.
Fig. 3.
Inventor
WILLIAM S. WAGONER
By Semmes, Keegin, Beale & Semmes
Attorneys Nov. 20, 1945.   W. S. WAGONER   2,389,474
APPARATUS FOR MOLDING BLOCKS
Filed Jan. 19, 1944   2 Sheets-Sheet 2
Fig. 6.
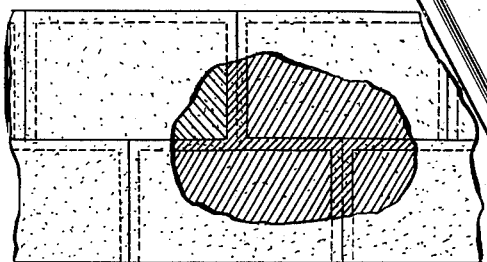
Fig. 7.
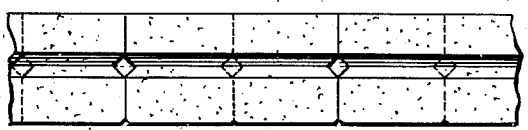
Fig. 8.
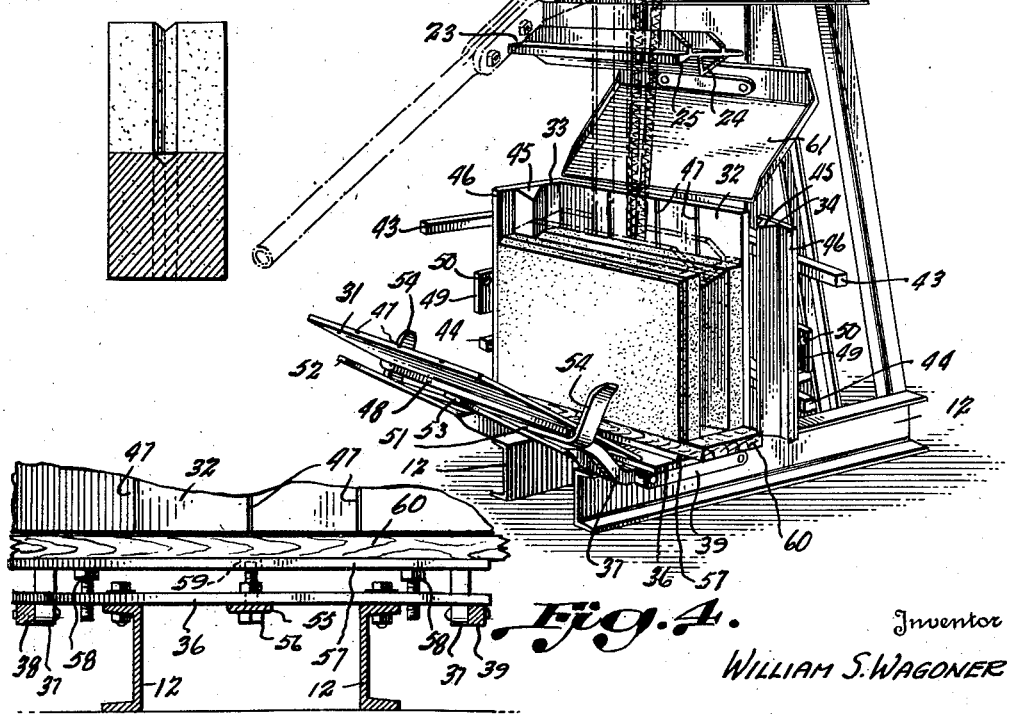
Fig. 5.
Fig. 4.
Inventor
WILLIAM S. WAGONER
By Semmes, Keegin, Beale & Semmes
Attorneys Patented Nov. 20, 1945

2,389,474

UNITED STATES PATENT OFFICE 2,389,474

APPARATUS FOR MOLDING BLOCKS

William S. Wagoner, Gibsonville, N. C.

Application January 19, 1944, Serial No. 518,903

4 Claims. (Cl. 25—87)

This invention contemplates the molding of building blocks of uniform size and density from plastic or semi-plastic material, and more specifically this invention relates to machines for manufacturing building blocks from concrete.

Concrete blocks are used quite extensively as building material in the construction of many kinds of buildings of both the business and residential types. These blocks are generally rectangular in shape and of such size as to be readily handled by workmen. Some of the blocks are provided with a tongue and groove, while others are formed according to various patterns. The block made in accordance with the present invention is preferably grooved on both ends and on at least one horizontal edge, although in some instances it may be desirable to have only one or more grooves and such an arrangement is deemed to be within the scope of this invention.

When using these blocks in the actual construction of a building, a course of blocks is laid up dry, on the preceding tier, preferably with the horizontal groove uppermost, and the vertical end grooves of adjacent blocks joining to form a small well. Thin grouting is then poured into these wells, filling them and flowing into the horizontal grooves of the lower course to bond together both the blocks in the course and the adjacent courses. On solidification, the adjacent blocks are securely bonded together by the many intersecting columns of cement between them. This procedure in building is deemed to be much faster than where each block is laid in a thickness of bonding cement placed on top of the lower block. It is also easier to keep each course of slabs level since the bonding cement can be dispensed with.

It is the common practice to reinforce the walls of many types of buildings with wire or small steel rods. The interconnecting grooves of these blocks provide excellent means for positioning such reinforcing rods and cables within the walls. Where desirable, electric cables may also be run through these grooves.

In the formation of the blocks, especially where the press is hand operated, it is often difficult, in the ordinary machines, to apply sufficient pressure on the plunger to compress the plastic material into blocks of uniform density. To this end, various power multiplying devices have been suggested but none of them have completely and satisfactorily accomplished their given purpose.

It is also important that the mold be not only rigidly and firmly held during the formation of the block but also that it should be readily opened on one or more sides to freely release the compressed block.

Where the mold and press are formed separately and operatively combined with each other to produce a block forming machine, the blocks frequently vary in size and thickness due to improper alignment of the mold or plunger.

Accordingly it is one of the objects of this invention to provide an improved machine for the molding of building blocks.

Another object of this invention is to produce a building block of uniform density and having a particular design.

Still another object of this invention is to provide a strong yet compact press for the formation of building blocks.

A further object of this invention is, in the production of building blocks, to provide a molding apparatus having an improved control for the plunger.

A still further object of this invention is to provide a novel arrangement for operating the reciprocating plunger of a compressing apparatus whereby building blocks of more uniform compactness may be produced.

Yet a further object of this invention is to provide a durable yet simple sectional mold for use in the manufacturing of building blocks.

Another object of this invention is to provide means for adjusting the mold to a position perpendicular to the plunger of a press and for maintaining it in that position throughout the molding operation.

These and other objects and advantages of the invention will be apparent from the following detailed description, taken in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 1 is a side elevational view of the mold and press incorporating this invention.

Figure 2 is a front elevational view of the block molding machine.

Figure 3 is a sectional view of a portion of the mold taken on line 3—3 of Figure 1.

Figure 4 is an elevational view, partly in section, of the mold taken on line 4—4 of Figure 1.

Figure 5 is a perspective view of the press and mold, with the latter having the front and one end open exposing a molded block.

Figure 6 is an elevational view, partly in section, of a portion of a wall employing the building blocks formed according to this invention.

Figure 7 is a plan view of a portion of a wall showing the upper horizontal groove.

Figure 8 is an end elevational view, partly in section, through a portion of the wall shown in Figure 6.

Referring to the drawings, an open topped block forming mold is generally shown at 10 supported on a frame 11. More particularly the frame consists of paralleled channel members 12 and an upright standard 13 welded or otherwise secured to the members at approximately their midpoints. A pair of braces 14 are similarly secured to the members at their respective ends remote from the mold and are inclined upwardly, terminating adjacent the upper extremity of the standard 13. The standard and the braces 14 are interconnected at their upper extremities by a pair of cross pieces consisting of angle irons 15, and centrally by a second pair of channel beams 16. It will be noted in Figure 1 that the several cross pieces 15 and 16 extend beyond the standard 13 to a position overhanging the mold 10. The free ends of the cross pieces 15 are interconnected by spaced plates 17 and 18 while the free ends of members 16 are interconnected by a pair of spaced angle irons 19 and 20. A reciprocating plunger 21 is disposed in the aligned passages between the plates 17—18 and 19—20 and is normally maintained in an elevated position by a pair of coil springs 22 secured in a suitable manner to the lower portion of the plunger, and the upper guide plate 18.

The lower end of the plunger is provided with a presser block or ram 23 of substantially the same area as that of the inside of the closed mold. Formed on the lower surface of the ram is a block grooving core 24 and a core 25 for beveling one marginal edge of the block.

A manually operated handle 26 is provided with a pair of identically shaped arms 27. These arms may be integrally formed with the handle 26 or may be detachably secured thereto as shown throughout the several figures. Each of the arms is provided with a plurality of openings adjacent its free end to accommodate one end of a pair of links 28 which form a swinging pivotal connection between the arm and the free ends of the stationary cross pieces 16. Additionally, each of the arms 27 has one or more openings intermediate its ends to receive one end of a second pair of links 29 which form a second swinging pivot between the arms and the plunger 21. The plunger and the stationary members 16 are, of course, provided with drilled openings to receive the other ends of their respective links.

In the embodiment of Figures 1 and 2, the mold 10 having front and rear walls 31 and 32, end walls 33 and 34, and a base 36 is secured in any acceptable manner to the channel frame members 12. The front and rear walls are supported on this base by means of leaf straps 37 riveted or otherwise firmly secured to the wall and hingedly connected to each end of a pair of strap members 38 and 39 which are in turn secured to the underside of the base plate 36 adjacent each end thereof. The rear wall of the mold has a pair of upper and lower horizontal straps 40 and 41 firmly secured to its outer surface and which project slightly beyond the mold wall to receive hinge pins 42.

Each end of the mold also has upper and lower wing straps 43 and 44 likewise rigidly secured to their outer surfaces and are pivotally connected to the pins 42 to hinge the ends 33 and 34 of the mold to the back 32.

The end walls are provided on their inner surfaces with vertically disposed groove forming cores 45, similar in all respects to the core 24 on the ram 23. The several cores are positioned in such a manner as to form the grooves in the block at approximately the center of the respective marginal edges. Adjacent each of the groove forming cores 45 are additional cores 46 for beveling the front vertical edges of the block. The several cores may be integrally formed with the ends of the mold or they may be separate pieces secured thereto in any acceptable manner.

Blocks of one-half or one-quarter size are required to complete the wall at corners, around windows and doors and so forth. To adapt my mold to the formation of such blocks, small oppositely disposed grooves 47 are provided in opposite sides of the mold, as best shown in Figures 3 and 5. Thin partition plates, not shown, would be positioned in a pair of opposite grooves to form a block of the desired size. It is also within the scope of this invention to provide a mold and plunger suitable for forming curved blocks such as required in the construction of silos and certain types of buildings.

In the process of packing or compressing the plastic material, a high pressure is developed within the mold which acts against the sides and ends thereof tending to force them outwardly. To maintain the mold in closed position, various locking devices are provided. The front wall 31 of the mold has, firmly secured to its outer surface, a locking rod 48 which is slightly longer than the mold wall and overhangs each end. Latch plates 49 are secured to the outer surfaces of each end wall of the mold in such a manner that a portion of each plate extends over the free vertical edge of the wall. These plates are provided with openings 50 to receive the ends of the rod 48 when the mold is in closed position as illustrated in Figures 2 and 3.

The end walls of the mold are retained in closed position by a locking frame which includes a horizontal strap 51 riveted or otherwise permanently secured to two spaced vertical straps 52 and 53, the latter straps being hinged to the adjacent ends of the straps 38 and 39 below the base. The horizontal strap 51 is provided with right angularly bent end portions or spring fingers 54 which are adapted to engage and confine the latch plates 49.

An angularly inclined rest 55 extends outwardly from the mold base 36, to which it is secured by a bolt 56, and supports the locking frame and the front wall of the mold when they are moved to open position as shown in Figure 5.

One of the salient features of this invention includes a leveling device for the mold by which the angularity of the block supporting surface may be adjusted to a true parallel relationship to the compressing surface of the plunger and maintained in such position throughout the molding operations. Referring to Figures 3 and 4, it will be noted that the mold base 36 supports a freely movable sub-base 57 by means of a number of bolts 58 which are threadedly adjustable in the base 36. It will thus be seen, for instance, that by adjusting one pair of end bolts, the elevation of that end of the sub-base may be varied relative to the other end. Other desired adjustments may be as readily obtained by manipulating other of the bolts. If found desirable, suitable locking nuts may be used to retain the bolts in adjusted position. The sub-base 57 is maintained in its approximately central position on the adjustable bolts 58 by having the end of the bolt 56 project through a slightly enlarged central opening 59. It is to be noted that Figure 3 is shown with the sub-base 57 removed to more clearly illustrate the parts.

Due to the fact that a newly formed block is readily broken by direct handling, before it has "set," it is the accepted practice to form the block on a flat surface on which it remains during the "setting" process. By this means, the support and block may be easily moved from place to place without injuring the latter. To that end, a flat member 60 is shown in Figures 4 and 5 resting directly on the sub-base 57 but not connected therewith. This member may be composed of any suitable material but since many of them may be required, wood is usually employed. As shown more clearly in Figure 5, it is cut to fit snugly within the closed mold below the groove forming cores 45.

A shield or trough 61 is secured to the standard 13 in any suitable manner and directs the plastic material into the open top of the mold. It will be noted in Figure 5 that the top of the mold extends a short distance above the compressed block. This space represents the amount the plastic material is compressed to produce a block of given size since the mold is filled to the top at each operation.

A stop 62 is secured in any manner on the plunger and is adapted to limit the downward stroke of the plunger by contacting the upper surface of the plate 19. The stop may be made adjustable and locked in any position as clearly shown in Figure 2.

In the operation of the machine, it is assumed the sides of the mold have been closed and locked and that it has been completely filled with plastic material. Considering the handle 26 and the arms 27 as a single lever fulcrumed at its outer end by links 28 to the stationary supports 16, movement of the handle towards the dotted line position, shown in Figure 5, will force the plunger 21 downwardly by reason of the links 29 interconnecting the plunger with the mid point of the lever. As the plunger continues its downward descent, the ram 23 and its block shaping cores 24 and 25 will engage and enter the top of the mold to compress the plastic material. As the plunger nears the bottom of its stroke the resistance of the material to further compression increases greatly. However, it will be noted that due to the particular linkage arrangement, the pressure applicable to the plunger also increases to a proportionately greater extent. This very desirable result is achieved, in levers of the class here illustrated, by having the point of pressure approach the fulcrum of the lever. The point of pressure is designated as that point where links 29 interconnect with the plunger. Referring again to Figure 5, the dotted line position of this point is shown as being opposite and closely adjacent the fulcrum. It has been found that adequate pressures to meet all needs can be developed by this specific arrangement of the levers and pivots. However, the ends of the links 28 and 29 may be inserted in other of the openings provided on the arms 27 to vary the pressure available at the plunger and the amount of force required on the handle 26. Regardless of the adjustment of the links, the downward movement of the plunger will be arrested when the stop 62 engages the surface of plate 19.

At the completion of the compressing stroke the lever is released and together with the plunger is returned to their upper positions by the resilient means secured to the plunger. The compressed block is then ready to be removed from the mold.

One convenient arrangement for opening the mold consists in extending the vertical straps 52 and 53, of the locking frame, upwardly a short distance to provide hand engaging portions which may be grasped to swing the locking frame outwardly to the inclined position, thereby releasing the end walls of the mold. The latter may then readily be opened by grasping the lengthened portion of the rods 43 and rotating the doors on their pivot pins 42. This will in turn free the ends of the locking rod 48 from the locking plates 49 permitting the front wall of the mold to be opened to the position shown in Figure 5. The rear wall of the mold may be tilted only slightly to break the surface contact of the plastic material.

With both ends and the front of the mold open and the surface tension between the newly formed block and the rear wall of the mold broken, the board and the block formed thereon may be removed and conveyed to a protected place where the "setting" process may be completed.

With the brushing away of any loose material, placing a new board on the sub-base, closing and locking the respective sides of the mold and the refilling of the mold, the block forming operation may be repeated.

While this invention has been described in connection with certain specific embodiments, the principles involved are susceptible of numerous other applications which may readily occur to persons skilled in the art. The invention is, therefore, to be limited only as indicated by the scope of the appended claims.

Having thus described the various features of the invention, what I claim as new and desire to secure by Letters Patent is:

1. In a machine for making building blocks of compressible material and having a mold, a plunger and a common support therefor, a manually operable and fully floating lever for controlling said plunger, linkage means forming a pivoting connection between one end of the lever and the support, and additional linkage means forming a second pivoting connection between said lever intermediate its end and said plunger.

2. In a machine for making building blocks of compressible material and having a mold, a plunger and a common support therefor, a manually operable and fully floating lever for controlling said plunger, linkage means forming a pivoting connection between one end of the lever and the support, and additional linkage means forming a second pivoting connection between said lever intermediate its end and said plunger, the said lever having a plurality of openings adjacent its end for adjusting the pivotal connection of said first named linkage means.

3. In a machine for making building blocks of compressible material and having a mold, a plunger and a common support therefor, a manually operable and fully floating lever for controlling said plunger, linkage means forming a pivoting connection between one end of the lever and the support, and additional linkage means forming a second pivoting connection between said lever intermediate its end and said plunger, the said lever having a plurality of openings adjacent each of its pivots for adjusting the connection of each of said linkage means.

4. In a machine for making building blocks of compressible material, and having a mold adapted to receive the material to be compressed, a plunger for compressing the material in the mold, a common support for said mold and said plunger, a lever for controlling the movement of said plunger, linkage means interconnecting the lever with the support at a point of fulcrum, and with the plunger at a point of pressure, said linkage means being so constructed and arranged that downward movement of the lever moves the point of pressure progressively closer to the fulcrum to thereby increase the compressing force of the plunger.

WILLIAM S. WAGONER.